United States Patent [19]

Eckberg

[11] Patent Number: 4,663,185

[45] Date of Patent: May 5, 1987

[54] NOVEL ACRYLATED POLYMERS

[75] Inventor: Richard P. Eckberg, Saratoga Springs, N.Y.

[73] Assignee: General Electric Company, Waterford, N.Y.

[21] Appl. No.: 757,103

[22] Filed: Jul. 19, 1985

Related U.S. Application Data

[62] Division of Ser. No. 608,748, May 10, 1984, Pat. No. 4,558,082.

[51] Int. Cl.$^4$ ............................................. B05D 3/06
[52] U.S. Cl. ........................... 427/54.1; 350/96.1; 524/104; 525/479; 556/462; 556/470; 428/429; 522/99; 528/21; 528/26
[58] Field of Search .................. 524/104; 525/479; 427/54.1; 204/159.13; 528/21, 26; 556/462, 470; 350/96.1; 428/429; 522/99

[56] References Cited

U.S. PATENT DOCUMENTS

| | | | |
|---|---|---|---|
| 3,650,813 | 3/1972 | Nordstrom et al. | 117/93.31 |
| 3,865,588 | 2/1975 | Ohto et al. | 96/33 |
| 3,878,263 | 4/1975 | Martin | 260/825 |
| 4,139,548 | 2/1979 | Tanaka et al. | 260/448.2 |
| 4,290,869 | 9/1981 | Pigeon | 204/159.13 |
| 4,293,397 | 10/1981 | Sato et al. | 204/159.13 |
| 4,293,678 | 10/1981 | Carter et al. | 528/12 |
| 4,306,050 | 12/1981 | Koerner et al. | 528/26 |
| 4,558,082 | 12/1985 | Eckberg | 528/21 |

*Primary Examiner*—Melvyn I. Marquis
*Attorney, Agent, or Firm*—Gary L. Loser

[57] ABSTRACT

Acrylated silicone polymers are prepared by reacting limoneneoxide-functional silicones with acrylic acid or a substituted acrylic acid in the presence of a catalyst selected from tetraalkylurea (e.g. tetramethylurea), tetraalkylguanidine (e.g. tetramethylguanide) or mixtures thereof. Adhesion of the resulting ultraviolet light curable compositions to various substrates, especially super calendared kraft papers, can be improved with the addition of N-vinylpyrrolidinone.

33 Claims, No Drawings

NOVEL ACRYLATED POLYMERS

This application is a division of application Ser. No. 608,748, filed 5-10-84, now U.S. Pat. No. 4,558,082.

BACKGROUND OF THE INVENTION

The present invention relates to a novel process for making acrylated polymers and, more particularly, to a process for the acrylation of limoneneoxide-functional silicones so as to produce novel photosensitive compounds useful for making release coatings, optical fiber coatings and other silicone coatings.

A variety of acrylic and methacrylic functional siloxane monomers and polymers subject to photocure upon irradiation with ultraviolet light are known in the art.

Nordstrom et al., U.S. Pat. No. 3,650,813, discloses an acrylic-siloxane paint binder resin that is crosslinkable with vinyl monomers. Such binder is produced in a two step reaction wherein (1) a siloxane having two or more hydroxy or alkoxy functional groups per molecule is reacted with a hydroxy functional copolymer of acrylic monomers, and thereafter (2) the reaction product of the first step is reacted with a $C_5$ to $C_{12}$ monohydroxy acrylate, e.g., the monoester of a $C_2$ to $C_8$ diol and acrylic or methacrylic acid.

Ohto et al., U.S. Pat. No. 3,865,588, describes a planographic plate which employs acryloxy functional silicone polymers. Patentees teach that such acryloxy functional polymers can be prepared by the condensation reaction of an acryloxy containing silicon monomer with a siloxane polymer or silane diol, preferably in the presence of a well known catalyst such as sulfuric acid, phosphoric acid, trichloracetic acid, isopropyl orthotitanate, dibutyltindilaurate, or sodium ethylate.

Martin, U.S. Pat. No. 3,878,263, teaches that acrylate functional silanes or siloxanes may be prepared by the addition of a compound of the formula $$CR_2=\overset{R}{\underset{|}{C}}-\overset{O}{\underset{\|}{C}}-O-G$$

where G is an unsaturated radical to a compound of the formula

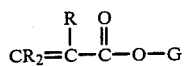

ps where Z is an $OR^1$, $R^1$ or $OSiR_3^1$ radical, R and $R^1$ are monovalent hydrocarbon radicals, and e equals 0 to 2. Such addition reactions are said to be preferably carried out in the presence of a platinum catalyst.

Tanaka et al., U.S. Pat. No. 4,139,538, discloses the preparation of methyldi(trimethylsiloxy) silylpropyl-gylcerol methacrylate by reacting methyldi(trimethylsiloxy) silylpropyl oxypropylene oxide with methacrylic acid in the presence of a catalyst such as potassium hydroxide, trimethylbenzylammonium chloride, triethylbenzylammonium chloride or triethylamine.

Pigeon, U.S. Pat. No. 4,290,869, provides photopolymerizable organopolysiloxane compositions prepared by reacting an α,ω-dihydroxydiorganopolysiloxane and an alkoxysilane monomer having acryloxy groups bonded thereto.

Sato et al., U.S. Pat. No. 4,293,397, describes photocurable organopolysiloxane compositions which comprise the reaction product of an amino-terminated diorganopolysiloxane and glycidyl acrylate or glycidyl methacrylate admixed with a photosensitizer.

Carter et al., U.S. Pat. No. 4,293,678, discloses acrylated epoxy silicones that are produced by the reaction of acrylic acid or methacrylic acid with an epoxy silicone. Suitable epoxy silicones are represented by the general formula

wherein M is an $R_3SiO_{0.5}$ group, D is an

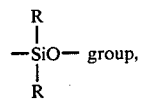

D'' is an

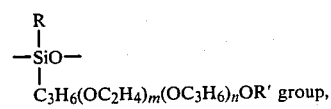

D' is an

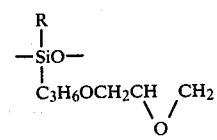

group or an

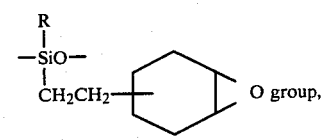

m is an integer from 0 to 25, n is an integer from 0 to 25, x is an integer from 0 to 100, y is an integer from 1 to 5 and z is an integer from 1 to 10. Other epoxy silicones having an oxirane group directly or indirectly attached to the siloxane backbone are also said to be effective. Carter et al. further disclose that 1,4-diazabicyclo (2.2.2) octane is particularly effective as a catalyst for the reaction. Other useful catalysts are said to include p-toluene sulfonic acid, methane sulfonic acid, trifluoroacetic acid, morpholine, tributylamine and benzyldimethyl amine. This disclosure is incorporated by reference into the instant specification.

Koerner et al., U.S. Pat. No. 4,306,050, relates to a process for providing UV curable silicone compositions by reacting an organopolysiloxane having SiCl groups with pentaerythritol triacrylate or pentaerythritol trimethacrylate.

Eckberg in copending U.S. patent application Ser. No. 375,676, filed May 6, 1982, now allowed, U.S. Pat. No. 4,576,999, discloses a polyorganosiloxane containing units of the formula

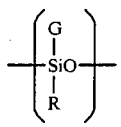

where R is hydrogen or a $C_{1-3}$ alkyl radical and G is, independently, a $C_{1-3}$ alkyl radical, an epoxy functional organic radical or from 2 to 20 carbon atoms, or an acrylic functional organic radical of from 2 to 20 carbon atoms, with at least one polymer unit being epoxy and/or acryloxy functional. Methods for making such compositions are also provided.

One disadvantage of several of the aforementioned acryloxy functional compositions is that they lack hydrolytic stability. Another disadvantage suffered by some of the foregoing compositions is that their acrylic substituents can only be bonded to terminal silicon atoms or to silicon atoms on the polysiloxane chain by way of an SiOC linkage. Still another disadvantage of prior art compositions is that they are often colored, murky fluids, which limits their depth of cure because ultraviolet light cannot penetrate such opaque fluids.

SUMMARY OF THE INVENTION

It is an object of the present invention to provide a process for making hydrolytically stable organopolysiloxane compositions which are photocurable.

It is another object of the present invention to provide a process for making substantially clear organopolysiloxane compositions which cure upon exposure to ultraviolet irradiation.

It is still another object of the present invention to provide clear photocurable, acrylic functional organopolysiloxane compositions which can be used as fiber optic coatings, paper release coatings, or other silicone coatings.

In accordance with one aspect of the present invention there is provided a novel process for making acrylic functional siloxanes, comprising reacting (1) an epoxy functional siloxane with (2) acrylic acid or a substituted acrylic acid in the presence of (3) a catalyst selected from the group consisting of tetraalkylurea, tetraalkylguanidine and mixtures thereof.

The present invention also provides novel, clear, hydrolytically stable, UV curable siloxanes of the formula

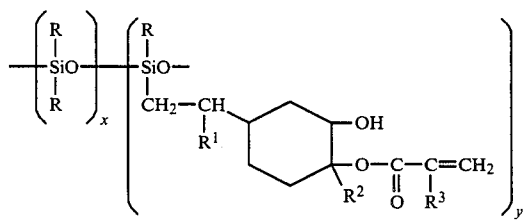

where R is a $C_{1-13}$ alkyl radical or substituted alkyl radical such as fluoroalkyl or cyanoalkyl, or a $C_{6-13}$ substituted or unsubstituted aryl radical, aralkyl radical or alkaryl radical; $R^1$ is hydrogen or a $C_{1-5}$ alkyl radical, preferably methyl; $R^2$ is hydrogen or a $C_{1-5}$ alkyl radical, preferably methyl; $R^3$ is hydrogen or a $C_{1-5}$ alkyl radical, preferably hydrogen; x and y are integers such that x+y is in the range of from about 5 to about 1000 with the proviso that $y \leq x$ and such that the viscosity ranges from about 20 to about 100,000 centipoise at 25° C. Preferably y is at least 6 and preferably x+y (the total number of siloxy units) is at least 120, and more preferably x+y is at least 200 and y is at least 20.

In another aspect of the present invention there is provided a process for improving anchorage of acryloxy functional, photocurable siloxane to a substrate comprising adding to said siloxane an effective amount of N-vinylpyrrolidinone. Silicone compositions containing N-vinylpyrrolidinone as an adhesion promoter are also provided.

These and other objects will become apparent to those skilled in the art upon consideration of the following description, examples and claims.

DESCRIPTION OF THE INVENTION

In its broadest aspect the present invention provides a novel process for making acrylic functional polysiloxanes, comprising reacting (1) an epoxy functional polysiloxane with (2) acrylic acid, substituted acrylic acid or mixture thereof in the presence of (3) a catalyst selected from the group consisting of tetraalkylurea, tetraalkylguanidine and mixtures thereof.

In a particularly preferred embodiment of the instant invention the epoxy functional polysiloxane composition is a limoneneoxide-functionalized silicone polymer of the formula

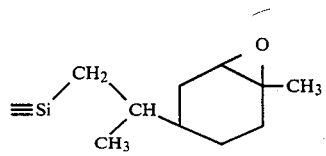

which is reacted with acrylic acid in the presence of tetramethylurea or tetramethylguanidine catalyst to provide a silicone polymer having at least one unit of the formula

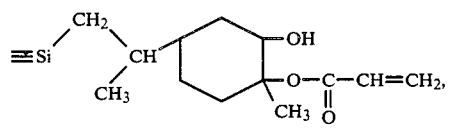

and preferably having six or more of such units per polymer chain, said polymer chain preferably having at least 125 siloxy units. The position of the hydroxyl and acrylic moieties may be as represented or may be reversed.

It is, of course, well known in the silicone art that the symbol ≡Si depicts the non-reactive or non-functional portion of a large silicone polymer. Ordinarily the major portion of a silicone molecule does not take part in curing or crosslinking reactions nor in syntheses involving the production of copolymers. Thus, it is usual to illustrate only the reactive specie which is attached to the siloxane backbone.

Epoxy functional polysiloxanes are well known in the art and many are commercially available. Generally the epoxy functional silicones which may be employed in practicing the process of the present invention include any silicone polymers wherein the epoxy group is directly or indirectly bonded to the siloxane chain.

Included among the preferred epoxy functional siloxane units are units of the formula

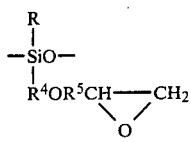

and

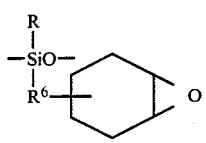

where R is as previously defined, $R^4$ and $R^5$ are $C_{1-5}$ alkyl radicals and $R^6$ is a $C_{2-8}$ alkyl radical.

Of course, the most preferred epoxy functional polysiloxane for practicing the process of the present invention is a limoneneoxide functionalized siloxane of the formula

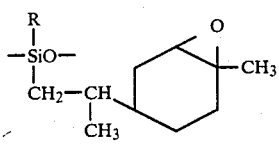

where R is as previously defined. A novel method of preparing such limoneneoxide functionalized polysiloxanes is described by Eckberg in U.S. patent application Ser. No. 375,676, filed May 6, 1982, now allowed, and which is incorporated herein by reference. Briefly, the synthesis of limoneneoxide functional silicones as taught by Eckberg involves the addition reaction of limoneneoxide to a linear methylhydrogen copolymer according to the reaction equation

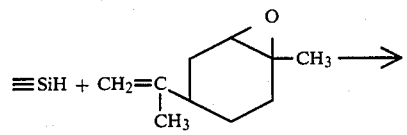

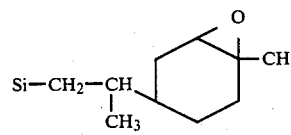

In practicing the process of the present invention there is reacted with the epoxy functional polysiloxane, acrylic acid, a substituted acrylic acid or mixture thereof. Most preferably acrylic acid or methacrylic acid is utilized, however, other suitable acrylic-containing compounds such as hydroxyalkylacrylates will be obvious to those skilled in the art.

One aspect of the present invention resides in the surprising discovery that tetraalkylurea compounds and tetraalkylguanidine compounds are particularly effective catalysts for promoting acrylation of the epoxy functionalized polysiloxane.

Particularly effective as acrylation catalysts are 1,1',3,3'-tetramethylurea,

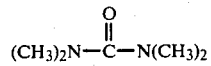

and 1,1',3,3'-tetramethylguanidine,

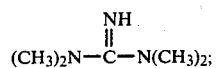

and mixtures thereof.

While the amount of tetraalkylurea or tetraalkylguanidine must be effective for promoting acrylation, the amount of such catalyst employed is not critical. In general, the amount of catalyst employed can range from as little as 0.01 percent by weight to 5.0 percent by weight or more, and preferably ranges from 0.1 to 2.0 percent by weight. The quantity of catalyst which is most effective for promoting acrylation under a particular set of conditions can readily be determined by the skilled artisan without undue experimentation.

In another aspect of the present invention, the instant applicant has surprisingly found that, unlike the colored or murky acrylated polysiloxanes of the prior art, the reaction product of certain epoxy functional polysiloxanes with acrylic or substituted acrylic acid in the presence of the tetramethylurea or tetramethylguanidine catalysts results in a substantially clear, hydrolytically stable, UV or electron beam curable silicone composition of the formula

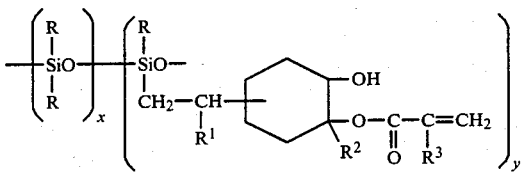

where R is a $C_{1-13}$ alkyl radical or substituted alkyl radical such as fluoroalkyl or cyanoalkyl, or a $C_{6-13}$ aryl, aralkyl or alkaryl radical; $R^1$ is hydrogen or a $C_{1-5}$ alkyl radical, preferably methyl; $R^2$ is a $C_{1-5}$ alkyl radical, preferably methyl; $R^3$ is hydrogen or a $C_{1-5}$ alkyl radical, preferably hydrogen; x and y are integers such that x+y ranges from about 5 to about 1000, with the proviso that x is greater than or equal to y and such that the viscosity ranges from about 20 to about 100,000 centipoise at 25° C. Preferably there are at least 6 y units per polymer chain and preferably such polymer chain contains at least 120 siloxy units and more preferably at least 200 siloxy units.

The silicone compositions provided by the process of the present invention are excellent ultraviolet light curable or electron beam curable paper release coatings. Such coating compositions can contain up to 10 percent or more by weight of a photoinitiator or combinations thereof when they are to be cured by light radiation. These photoinitiators are well known to those skilled in the art and, illustrative thereof, one can name 2,2-diethoxyacetophenone, benzophenone, p-methoxylbenzophenone, acetophenone, propiophenone, xanthone, benzoin, benzil, naphthoquinone, anthraquinone, t-butylperbenzoate and the like.

In another aspect of the present invention it was also surprisingly discovered that UV and electron beam curable silicone compositions such as those prepared by the process of the present invention, exhibit improved anchorage to a substrate such as, for example, supercalendered Kraft (SCK), when N-vinylpyrrolidinone is included in the composition. Generally the amount of N-vinylpyrrolidinone effective for improving anchorage or adhesion of the curable composition to the substrate ranges from 0.01 to 20.0 percent by weight. The preferred amount of N-vinylpyrrolidinone is in the range of 0.5 to 5.0 percent by weight.

As those skilled in the art recognize, the majority of the organo groups bonded to the siloxane chain of the foregoing paper release compositions are methyl groups. However, the present applicant has further discovered that the inclusion of sufficient phenylsiloxane units raises the polymer index of refraction above 1.5 and causes the polysiloxane prepared from limoneneoxide functional silicone and acrylic acid to be especially useful as fiber optic coating compositions.

Any of the foregoing acrylated silicone compounds prepared in accordance with the process of the present invention can be used alone or in admixture with conventional solvents, fillers and other additives. They can be applied by conventional means and cured by exposure to heat, light, electron beam radiation or any other known means of curing and crosslinking, in the presence of suitable curing catalysts.

While paper release and fiber optic coatings are the preferred uses of the compositions prepared by the process of the present invention, these compositions can also be applied to other suitable substrates such as wood, metal, glass, plastic, or the like in any shape or form.

In order that those skilled in the art will be better able to understand and practice the present invention, the following examples are provided. It is to be understood that the examples are given for the purpose of illustrating the invention and are not intended to be limiting in any way. Unless otherwise specified, all parts are parts by weight.

EXAMPLE 1

In this example 272 grams of a 1235 cps. epoxy functional dimethylpolysiloxane fluid incorporating 16.9 weight percent chemically bonded limoneneoxide (0.3 moles oxirane) were heated to 70° C. 1.0 gram 1,4-diazabicyclo [2.2.2] octane was added and the mixture slowly heated to 90° C. when 21.6 grams acrylic acid (0.3 moles) were slowly added thereto. Following the addition of acrylic acid the reaction mixture was maintained at 90° C. for three hours. It was noted that the mixture had set to an opaque, tan colored gel. It should be noted that this example follows the teaching of Carter et al., U.S. Pat. No. 4,293,678, and illustrates that the product produced thereby is unsatisfactory for coating purposes.

EXAMPLE 2

In this example 200 grams of a 300 cps. epoxy silicone fluid containing 9.6 weight percent limoneneoxide (0.126 moles oxirane) were dispersed in 200 grams toluene. The solution was then heated to 90° C. before addition of 0.56 gram 1,4-diazabicyclo [2.2.2] octane and 9.1 grams acrylic acid (0.126 moles). The reaction mixture was maintained at 90° C. for 18 hours, followed by removal of solvent under 16 mm Hg vacuum at 125° C. An extremely murky, tan colored opaque fluid having a viscosity of about 740 cps. was obtained. Filtration using Fuller's earth filter aid failed to improve the appearance of the product. Carrying out the acrylation in solvent did not improve the product's appearance. (Effecting reaction in a solvent was done to eliminate the insolubility of 1,4-diazabicyclo [2.2.2] octane, the preferred catalyst or Carter et al., in the acrylated limoneneoxide functionalized polydimethylsiloxanes of the instant invention.)

EXAMPLE 3

In this example the 1,4-diazabicyclo [2.2.2] octane catalyst of Carter et al. was replaced with triethylamine, as taught by Fekete et al., U.S. Pat. No. 3,373,075. Thus, 600 grams of a 960 centipoise epoxy silicone fluid having 11.4 weight percent limoneneoxide (0.45 moles oxirane) were dispersed in 400 grams toluene. 6 grams of triethylamine were than added and the mixture heated to 90° C. A solution of 32.4 grams acrylic acid in 100 grams toluene was then added dropwise. The reaction mixture was maintained at 90° C. for 2.5 hours and then warmed to 110° C. for 18 hours. Removal of solvent in vacuo afforded 617 grams of an opaque brown fluid having a viscosity of approximately 1250 cps. The appearance of this material was substantially the same as that of Example 2. Substitution of the more siloxane-soluble tri-n-hexylamine for the triethylamine did not alter the appearance of the product.

EXAMPLE 4

In this example 418 grams of a 1200 centipoise epoxy silicone fluid having 11.7 weight percent limoneneoxide (0.32 moles oxirane) and 4.2 grams 1,1',3,3'-tetramethylurea (TMU) were dispersed in 400 grams toluene and heated to 100° C. A solution of 23 grams acrylic acid (0.32 moles) in 50 grams toluene was slowly added to the reaction mixture. The reaction mixture was maintained at 100° C. for 20 hours. Solvent was removed by vacuum stripping at 130° C. under 10 mm Hg pressure to provide 440 grams of a clear 1925 centipoise fluid. This example illustrates that tetramethylurea is an effective acrylation catalyst. This example also shows that the use of TMU as an acrylation catalyst, coupled with carrying out the reaction in solvent, provides products superior in apperance to products prepared by prior art processes.

In order to illustrate that compositions prepared in accordance with the process of the present invention are improved over those of the prior art, additional examples were prepared using TMU as an acrylation catalyst as follows:

TABLE 1

| | ACRYLATION EXPERIMENTS | | | |
|---|---|---|---|---|
| Ex # | % Epoxy* | Initial Viscosity | Acrylated Viscosity | Product Appearance |
| 1 | 16.9 | 1235 | (GEL) | Opaque mass |
| 2 | 9.6 | 400 | 740 | Opaque fluid |
| 3 | 11.4 | 940 | 1250 | Opaque fluid - gelled on standing (3 weeks) |
| 4a** | 11.7 | 700 | 1925 | Clear Fluid - shelf stable |
| 4b | 16.0 | 325 | 1150 | Clear Fluid - shelf stable |
| 4c | 16.8 | 345 | 1850 | Clear Fluid - shelf stable |
| 4d | 24.8 | 1075 | 10000 | Slight Haze - shelf stable |
| 4e | 24.3 | 900 | 15000 | Clear Fluid - shelf stable |

TABLE 1-continued

ACRYLATION EXPERIMENTS

| Ex # | % Epoxy* | Initial Viscosity | Acrylated Viscosity | Product Appearance |
|------|----------|-------------------|---------------------|--------------------|
| 4f   | 24.2     | 1100              | 9500                | Clear Fluid        |

*Expressed as weight % limoneneoxide
**All Examples 4a–f utilized 1 weight percent TMU promoter The cure characteristics of these compositions were then studied as follows: experimental materials were combined with commercially available photoinitiators and/or sensitizers, then coated as approximately 1 mil sections on a polyethylene kraft substrate. The coated material was exposed to medium pressure mercury ultraviolet lamp radiation in a PPG Model 1202AN Processor at variable line speed, either under nitrogen or in air. Cure was qualitatively assessed by checking the exposed coatings for smear, migration, rub off, depth of cure and other obvious indications of completeness of cure. The results are set forth in Table 2.

Thick sections (1 mil or more) of the opaque mixtures are not cured through. This is probably because the UV light cannot penetrate into such opaque coatings.

As with other acrylates, amine/benzophenone combinations permit curing of the composition in air. However, more rapid curing of compositions prepared according to the process of the present invention is possible when curing is effected under an inert atmosphere such as nitrogen.

In addition, blends of acrylated limoneneoxide-functional silicones prepared via the TMU-promoted synthesis with certain multifunctional acrylate monomers can be efficiently UV-cured to clear, glossy coatings within the scope of the instant invention. Some illustrations of this aspect of the present invention are set forth in Table 3.

TABLE 3

SILICONE - ACRYLATE BLENDS*

| Blend | UV Power, Watts inch$^{-2}$ | Thickness, Mils | ATM | Line Speed, Meters sec$^{-1}$ | Remarks |
|-------|------------------------------|-----------------|-----|-------------------------------|---------|
| 50% Ex 4c<br>50% CL-2000 | 400 | 4 | $N_2$ | 2.0 | Excellent cure; clear, glossy film |
|  | 400 | 8 | $N_2$ | 2.0 | 'skin cure', not all the way through |
| 50% Ex 4c<br>25% CL-2000<br>25% TMPTA | 400 | 4 | $N_2$ | 2.0 | Translucent film - tough, through-cured sections. |
| 50% Ex 4c<br>25% CL-2000<br>25% DEGDA | 400 | 4 | $N_2$ | 2.0 | Cured to dull, low gloss film |
| 50% Ex 4c<br>25% CL-2000<br>25% HDDA | 300 | 4 | $N_2$ | 1.5 | Excellent cure to glossy, transparent film |

CL-2000 = CHEMLINK ® 2000; Difunctional acrylate, $C_{12}$–$C_{14}$ aliphatic chain, acrylate-stopped
TMPTA = Trimethylolpropanetriacrylate
DEGDA = Diethyleneglycoldiacrylate
HDDA = Hexanediolacrylate

TABLE 2

UV CURE EXPERIMENTS

| Exp # | Photo Initiators | Line speed, Meters/sec. | Cure ATM | Total Lamp power, Watts in $^{-2}$ | Section Thickness Mil | Qualitative Cure |
|-------|------------------|-------------------------|----------|------------------------------------|-----------------------|------------------|
| 2  | 5% DEAP | 2.0 | $N_2$ | 600 | 2 mil | smear-free, but only skin-cured, not through section |
| 3  | 5% DEAP | 2.0 | $N_2$ | 600 | 2 mil | smear-free, poor anchorage to PEK, cure confined to surface |
| 4a | 5% DEAP | 2.0 | $N_2$ | 400 | 2 mil | no smear-uniform cure throughout section |
| 4b | 4% DEAP | 2.0 | $N_2$ | 400 | 2 mil | excellent cure throughout section of fil no smear, good anchorage |
| 4c | 4% DEAP | 2.5 | $N_2$ | 500 | 2 mil | excellent cure - uniform through section good anchorage |
| 4d | 1.5% BP, 1.5% DEAP | 2.5 | $N_2$ | 400 | 2 mil | cured to glossy coating - excellent cure throughout section |
| 4d | 1.5% BP, 1.5% I-651 | 2.5 | $N_2$ | 400 | 2 mil | tough, glossy film formed; smear-free |
|    | 1.5% BP, 1% NMDEA | 0.5 | Air | 400 | 2 mil | easily smeared-evidence of skin cure |
| 4d | 1.5% BP, 1% NMDEA | 2.5 | $N_2$ | 400 | 2 mil | excellent, hard cure |
|    | 1.5% BP, 1% NMDEA | 1.0 | Air | 400 | 2 mil | slight smear, good anchorage |
| 4e | 3% DEAP | 2.5 | $N_2$ | 300 | 2 mil | slight smear, fair anchorage |
| 4f | 4% DEAP | 2.0 | $N_2$ | 400 | 2 mil | slight smear, good anchorage |

DEAP = Diethoxyacetophenone (Upjohn)
I-651 = Irgacure ® 651 (Ciba-Geigy)
= Benzophenone
NMDEA = N—methyldiethanolamine Despite the subjective nature of these results it is apparent that the opaque compositions prepared according to prior art processes cannot be cured as well as the clear, single phase products of the TMU-promoted acrylation of limoneneoxide functional silicones.

EXAMPLE 5

This example illustrates the effectiveness of tetramethylguanidine as an acrylation catalyst. 760 grams of a 90 cps. dimethylhydrogen endstopped linear polydimethyl-methylhydrogen siloxane copolymer were dispersed in 760 grams hexane with 200 grams limoneneoxide and 1 gram of platinum catalyst. This mixture was refluxed for 15 hours at 70° C. Infrared analysis of the resulting solution showed that 1.22 moles limoneneoxide had been added (i.e. 19.6 weight percent limoneneoxide was present in the resulting polymer). Unreacted SiH was eliminated by brief reflux with hexene and the product was stripped of solvent and excess monomer to afford 954 grams of a 340 cps. epoxysilicone fluid. 750 grams of this epoxysilicone fluid (0.967 moles oxirane) were dissolved in 700 grams toluene and 7.5 grams tetramethylguanidine wre added thereto. This solution was heated to 100° C. at which point a solution of 69.6 grams acrylic acid (0.967 moles) in 100 grams toluene were slowly added dropwise. Following addition of the acrylic acid the reaction mixture was maintained at 105° C. for 18 hours. Stripping off the solvent yielded 792 grams of a clear fluid having a viscosity of 7000 centipoise at 25° C.

The resulting clear fluid was then combined with 4% diethoxyacetophenone photoinitiator and manually coated to a thickness of 1 mil on a polyethylene Kraft (PEK) substrate using an adhesive coater. The thus coated substrate was then exposed to two medium pressure mercury vapor ultraviolet lamps, each furnishing 200 watts/inch focused power. A clear, glossy, smear-free surface was obtained by curing at a line speed of 2 meters per second under nitrogen in the PPG model 1202 QC Processor.

EXAMPLE 6

In this example the use of tetramethylguanidine as an acrylation catalyst is illustrated in combination with an epoxysilicone of high refractive index. 578 grams of a 275 cps. linear trimethylsiloxy endstopped polydimethyl-diphenyl-methylhydrogen siloxane terpolymer fluid ($N_{25}^D = 1.5326$, % $D^H = 10.4$) were reacted with one mole limoneneoxide in hexane, utilizing a platinum hydrosilation catalyst to produce 689 grams of a 440 cps fluid having 19.6 weight percent limoneneoxide; $N_{25}^D = 1.5282$. This high refractive index epoxysilicone fluid was treated with 62 grams acrylic acid in the presence of 1% tetramethylguanidine in toluene at 118° C. reflux for 60 hours. Stripping off the solvent and other light ends left 714 grams of a clear acrylated epoxysilicone fluid having a viscosity of 7800 cps. at 25° C., $N_{25}^D = 1.5290$.

Co., Inc.) and catalyzed as in Example 6 to provide a clear blend. When applied to a substrate in a 1 mil thickness and exposed to 400 watts UV power at 2 meters per second line speed there resulted a hard, glossy, smooth composition.

It should be noted that the SR 349 is completely immiscible with low $N^D$ (1.42) acrylated epoxysilicones such as that employed in Example 5. However, the high phenyl content of the silicone polymer employed in this example renders it compatible with SR 349. This blend had a measured $N_{25}^D = 1.5300$.

EXAMPLE 8

In this example 250 grams of a 10,500 cps. limoneneoxide functionalized silicone fluid incorporating 11.1 weight percent limoneneoxide units and having $N_{25}^D = 1.5350$ were dispersed in 250 grams toluene having therein 5 grams tetramethylguanidine. This solution was then reacted with 13.1 grams acrylic acid at 110° C. over a total reaction time of 18.5 hours. Prior to stripping off the toluene, 250 grams of SR 349 were added. 504 grams of an approximately 1:1 blend of acrylated epoxysilicone: SR 349 were obtained after removal of solvent. This product was a clear fluid having a viscosity of 5600 cps. at 25° C.

This example shows that high viscosity epoxysilicones can be diluted by other acrylate functional compounds. When the acrylated epoxy silicone of this example was catalyzed with 4% diethoxyacetophenone, coated in a layer 2 mil thick on PEK, and exposed to 400 watts UV power at a line speed of 2.5 meters per second, there resulted a smooth, glossy, smear-free coating composition.

EXAMPLE 9

The acrylated epoxysilicone of Example 5 was tested for cure response to electron beam radiation using an Energy Sciences, Inc. electron beam processor. Coatings were laid down by hand on PEK substrate and then passed through the electron beam processor's curing chamber under an inert atmosphere. Each pass through the unit exposed the coating to a 1 megarad electron beam dose. Qualitative results are tabulated below:

| Sample* | | Sample Thickness | Dose, MR | Remarks |
| --- | --- | --- | --- | --- |
| 100% | Ex. 5 | 4 mil | 1 | Excellent cure to glossy surface - no smear, good anchorage |
| 80% | Ex. 5 | 2 mil | 1 | Cured - slight smear, no migration, glossy surface |
| 20% | Chemlink 2000 | | | |
| | Ex. 5 | 2 mil | 2 | Excellent cure - no smear, glossy surface |
| | Chemlink 2000 | | | |

*No photoinitiators present

The thus produced acrylated silicone fluid was treated with 4 weight percent Darocure ® 1173 (E.M. Chemicals) photoinitiator, then coated to a 1 mil thickness on PEK and cured under 600 watts focused UV power in the PPG processor described in Example 5 at a line speed of 1 meter per second. This resulted in a cured composition having a glossy finish somewhat softer than observed for non-phenyl containing acrylated methylsilicone fluids.

EXAMPLE 7

In this example one part of the acrylated silicone polymer of Example 6 was combined with one part ethoxylated bisphenol-A diacrylate (SR 349, Sartomer This example makes clear that tetramethylguanidine catalyzed acrylated epoxysilicone is readily curable by electron beam radiation as well as by ultraviolet light.

EXAMPLE 10

In this example the release characteristics of UV-cured Example 4b, alone and in combination with other diluents and coreactants, was determined. The following blends were utilized:

A: 4b + 4% diethoxyacetophenone
B: (9 parts 4b + 1 part N-vinylpyrrolidnone + 4% diethoxyacetophenone C: (9 parts 4b+1 part N-vinylpyrrolidinone+0.3 parts SS-4300c*)+3% benzophenone+4% diethoxyacetophenone.

* 25 cps. trimethylsiloxy-stopped polymethylhydrogensiloxane fluid.

The solvent-free coating mixtures were qualitatively screened by examining thin films hand coated on 40# supercalendered Kraft stock with a doctor blade and UV-cured in the PPG UV processor previously described. Cured coatings were assessed for smear, migration and rub-off as a function of machine line speed in a nitrogen atmosphere. The results are tabulated below:

| Blend | UV Power, watts | Line Speed | Remarks |
|---|---|---|---|
| A | 400 | 400 ft/min | Cured - slight smear, no migration, but coating readily rubbed off of SCK. |
| B | 400 | 400 ft/min | Cured - no migration, slight smear - rubbed off with hard pressure. |
|   | 600 | 500 ft/min | Cured - no migration, slight smear - rubbed off with hard pressure. |
| C | 400 | 400 ft/min | Cured - no migration, slight smear - rubbed off with hard pressure. |

The foregoing results show that N-vinylpyrrolidinone is useful for improving anchorage of the coating to the SCK substrate without affecting curing. It is also apparent that the methylhydrogen fluid, SS4300c, reacts with the acrylate groups of the silicone of Example 4b in the presence of 4% diethoxyacetophenone and 3% benzophenone. (There is a reaction analagous to a vinyl—Si/SiH addition reaction.)

Quantitative release results for the A, B and C blends were obtained as follows: 20% solutions of the three materials were prepared in hexane and then coated onto SCK stock using a #8 wire-wound rod on a mechanical lab coater. The coated substrates were passed through the PPG device at 100 feet/minute under a nitrogen atmosphere and irradiated with 400 watts per square inch total focused power. The cured coatings were then laminated with 7 mils of an aggressive SBR adhesive from Fasson, Inc. and a sheet of SCK. Two inch by eight inch tapes were prepared from these laminates and the force required to pull the silicone/SCK lamina away from the adhesive/SCK lamina at 180° angle at 400 ft/minute speed was recorded in grams for newly prepared laminate and one week-aged tapes (aged at 75° F., 60% Relative Humidity). Release recorded is listed below.

| Blend | Initial Release | 1 Week Release |
|---|---|---|
| A | 180-240 g | 140-180 g |
| B | 170-230 g | 135-160 g |
| C | 160-210 g | 145-195 g |

As can be appreciated, little difference is detected in aged release amongst these coating compositions, although the N-vinylpyrrolidinone containing compositions provided lower initial release.

EXAMPLE 11

This example helps illustrate the effectiveness of the tetramethylurea as an acrylation catalyst compared to the absence of any catalyst. 1000 grams of a 700 cps. epoxysilicone fluid having 16.5 weight percent limoneneoxide units were dispersed in 860 grams toluene with 100 grams 1,1′,3,3′tetramethylurea. The solution was heated to 100° C. at which time 90 grams acrylic acid (15 mole percent excess as compared to available oxirane) were slowly added over a one hour period. The reaction mixture was then maintained at 105° C. for 20 hours. Titration revealed 1.58 percent acrylic acid present at that time, with 4.59 percent originally added. Thus 0.82 moles of acrylic acid were incorporated into the polymer, or 75.5% of the available oxirane groups were converted to hydroxyacrylate groups.

When this experiment was duplicated in all respects except that no tetramethylurea was included as a cataylst, the acrylic acid content was only reduced to 3.9 percent following the 20 hour hold at 105° C. In other words, only 0.19 moles acrylic acid were added to the epoxysilicone—representing but 17.5 percent of available oxirane groups.

I claim:

1. A process for providing an article of manufacture, comprising:
   (a) reacting:
      (i) an epoxy functional polysiloxane with
      (ii) acrylic acid, substituted acrylic acid or mixture thereof in the presence of
      (iii) an amount of catalyst effective for catalyzing the reaction of (i) and (ii), said catalyst being selected from the group consisting of tetraalkylurea, tetraalkylguanidine and mixtures thereof;
   (b) applying the composition resulting from (a) to a substrate; and
   (c) curing said composition resulting from (a) to said substrate.

2. A process in accordance with claim 1 wherein the epoxy functional polysiloxane has at least one unit selected from the group consisting of

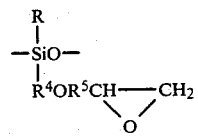

and

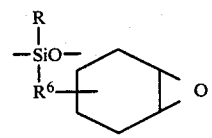

where R is a $C_{1-13}$ substituted or unsubstituted alkyl radical or a $C_{6-13}$ substituted or unsubstituted aryl radical, aralkyl radical or alkaryl radical, $R^4$ and $R^5$ are $C_{1-5}$ alkylene radicals and $R^6$ is a $C_{2-8}$ alkylene radical.

3. A process in accordance with claim 1 wherein the epoxy functional polysiloxane has at least one unit of the formula

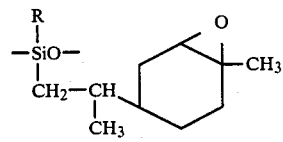

where R is a $C_{1-13}$ substituted or unsubstituted alkyl radical or a $C_{6-13}$ substituted or unsubstituted aryl radical, aralkyl radical or alkaryl radical.

4. A process in accordance with claim 1 wherein (a)(ii) is selected from the group consisting of acrylic acid and methacrylic acid.

5. A process in accordance with claim 1 wherein the catalyst is selected from the group consisting of 1,1',3,3'-tetramethylurea, 1,1',3,3'-tetramethylguanidine and mixtures thereof.

6. A process in accordance with claim 5 wherein the catalyst is present in an amount ranging from 0.01 percent by weight to 5.0 percent by weight.

7. A process in accordance with claim 5 wherein the catalyst is present in an amount ranging from 0.1 percent by weight to 2.0 percent by weight.

8. A process in accordance with claim 1 wherein the epoxy functional polysiloxane contains at least 6 epoxy groups per polymer chain.

9. A process in accordance with claim 8 wherein the epoxy functional polysiloxane contains at least 120 siloxy units per polymer chain.

10. A process in accordance with claim 8 wherein the epoxy functional polysiloxane contains at least 200 siloxy units per polymer chain.

11. A process in accordance with claim 1 wherein the composition resulting from step (a) further comprises an amount of photoinitiator effective for promoting curing of said composition upon exposure to an effective amount of ultraviolet or electron beam radiation.

12. A process in accordance with claim 1 wherein the composition resulting from step (a) further comprises an amount of N-vinylpyrrolidinone effective for improving anchorage of said composition to a substrate.

13. A process in accordance with claim 1 wherein the substrate is paper.

14. A process in accordance with claim 1 wherein the composition resulting from step (a) has sufficient phenyl groups present on the siloxane chain so as to provide a polysiloxane having a refractive index of at least 1.5000.

15. A process in accordance with claim 14 wherein the substrate is an optical fiber.

16. An article of manufacture comprising:
(a) the reaction product of
(i) an epoxy functional polysiloxane with
(ii) acrylic acid, substituted acrylic acid or mixture thereof in the presence of
(iii) an amount of catalyst effective for catalyzing the reaction of (i) and (ii), said catalyst being selected from the group consisting of tetraalkylurea, tetraalkylguanidine and mixtures thereof; and
(b) a substrate having the reaction product of (a) cured thereon.

17. An article of manufacture in accordance with claim 16 wherein the epoxy functional polysiloxane has at least one unit selected from the group consisting of

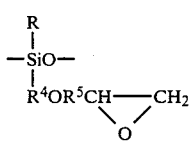

and

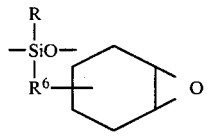

where R is a $C_{1-13}$ substituted or unsubstituted alkyl radical or a $C_{6-13}$ substituted or unsubstituted aryl radical, aralkyl radical or alkaryl radical, $R^4$ and $R^5$ are $C_{1-5}$ alkylene radicals and $R^6$ is a $C_{2-8}$ alkylene radical.

18. An article of manufacture in accordance with claim 16 wherein the epoxy functional polysiloxane has at least one unit of the formula

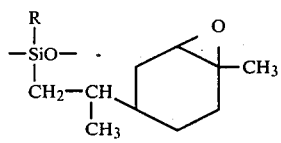

where R is a $C_{1-13}$ substituted or unsubstituted alkyl radical or a $C_{6-13}$ substituted or unsubstituted aryl radical, aralkyl radical or alkaryl radical.

19. An article of manufacture in accordance with claim 16 wherein (a) (ii) is selected from the group consisting of acrylic acid and methacrylic acid.

20. An article of manufacture in accordance with claim 16 wherein the catalyst is selected from the group consisting of 1,1',3,3'-tetramethylurea, 1,1',3,3'-tetramethylguanidine and mixtures thereof.

21. An article of manufacture in accordance with claim 20 wherein the catalyst is present in an amount ranging from 0.01 percent by weight to 5.0 percent by weight.

22. An article of manufacture in accordance with claim 20 wherein the catalyst is present in an amount ranging from 0.1 percent by weight to 2.0 percent by weight.

23. An article of manufacture in accordance with claim 16 wherein ther epoxy functional polysiloxane contains at least 6 epoxy groups per polymer chain.

24. An article of manufacture in accordance with claim 23 wherein the epoxy functional polysiloxane contains at least 120 siloxy units per polymer chain.

25. An article of manufacture in accordance with claim 23 wherein the epoxy functional polysiloxane contains at least 200 siloxy units per polymer chain.

26. An article of manufacture in accordance with claim 16 wherein reaction product (a) further comprises an amount of N-vinylpyrrolidinone effective for improving anchorage of said reaction product to the substrate.

27. An article of manufacture in accordance with claim 16 wherein the substrate is paper.

28. An article of manufacture in accordance with claim 16 wherein reaction product (a) has sufficient phenyl groups present on the siloxane chain so as to provide a polysiloxane having a refractive index of at least 1.5000.

29. An article of manufacture in accordance with claim 28 wherein the substrate is an optical fiber.

30. A process for improving the anchorage of ultraviolet or electron beam curable, polysiloxane compositions comprising the reaction products of an epoxy functional polysiloxane with acrylic acid, substituted acrylic acid, or mixtures thereof to substrates which process comprises (a) adding to said polysiloxane composition an effective amount of N-vinyl pyrrolidone; (b) applying said polysiloxane to a substrate, and (c) curing the coated substrate by exposing it to an effective amount of ultraviolet or electron beam radiation.

31. A process in accordance with claim 30 wherein the acryloxy functional polysiloxane composition is the reaction product of
  (a) an epoxy functional polysiloxane with
  (b) acrylic acid, substituted acrylic acid or mixture thereof in the presence of
  (c) an amount of catalyst effective for catalyzing the reaction of (a) and (b), said catalyst being selected from the group consisting of tetraalkylurea, tetraalkylguanidine and mixtures thereof.

32. A process in accordance with claim 30 wherein the substrate is paper.

33. A process for providing a polysiloxane composition which exhibits improved anchorage to a substrate upon the curing of said composition to said substrate, comprising adding an amount of N-pyrrolidinone to a composition comprising the reaction products of an epoxy functional polysiloxane with acrylic acid, substituted acrylic acid, or mixtures thereof which is effective for improving anchorage of the composition to the substrate.

* * * * *